(12) United States Patent
Kume et al.

(10) Patent No.: US 7,882,608 B2
(45) Date of Patent: Feb. 8, 2011

(54) METHOD OF POSITIONING MOVABLE BODY

(75) Inventors: Takayuki Kume, Ritto (JP); Hiroyuki Yamamura, Ritto (JP); Katsuhiro Fujimoto, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 646 days.

(21) Appl. No.: 12/000,446

(22) Filed: Dec. 12, 2007

(65) Prior Publication Data

US 2008/0178451 A1  Jul. 31, 2008

(30) Foreign Application Priority Data

Jan. 29, 2007 (JP) ............................. 2007-017645

(51) Int. Cl.
- B23P 11/00 (2006.01)
- B23Q 3/00 (2006.01)
- G01M 19/00 (2006.01)

(52) U.S. Cl. .............. 29/407.01; 29/407.05; 29/407.09; 29/407.1; 29/468

(58) Field of Classification Search .............. 29/407.01, 29/407.05, 407.09, 407.1, 468
See application file for complete search history.

(56) References Cited

FOREIGN PATENT DOCUMENTS

| JP | 58-215233 | A | 12/1983 |
|---|---|---|---|
| JP | 63-728 | U | 1/1988 |
| JP | 5-086446 | U | 11/1993 |
| JP | 6-182655 | A | 7/1994 |
| JP | 10-156665 | A | 6/1998 |
| JP | 2001-47336 | A | 2/2001 |
| JP | 2006-181660 | A | 7/2006 |

*Primary Examiner*—Jermie E Cozart
(74) *Attorney, Agent, or Firm*—Birch, Stewart, Kolasch & Birch, LLP

(57) ABSTRACT

In a case where the load is not smaller than the predetermined value, the positioning is not completed even when it is determined that the movable body is moved to the position supposed to be the target position, then the movable body is moved to a retry starting position different from the position supposed to be the target position, subsequently a retry operation is performed for moving the movable body from the retry starting position to the position supposed to be the target position, and consequently the positioning is completed when the load becomes smaller than the predetermined value after the retry operation is performed for a predetermined number of times.

6 Claims, 3 Drawing Sheets

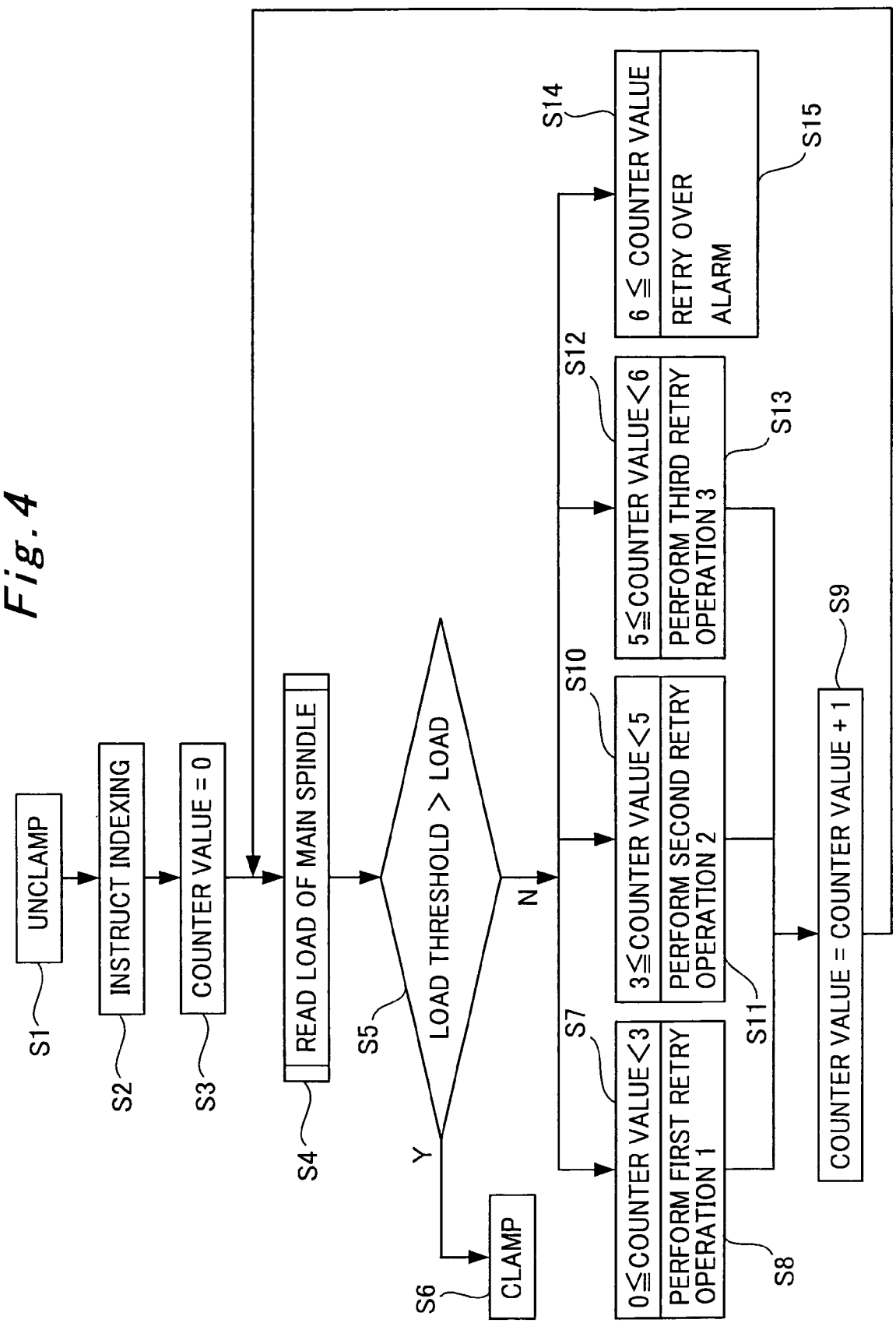

METHOD OF POSITIONING MOVABLE BODY

BACKGROUND OF THE INVENTION

1. Field of the Invention

The present invention relates to a method of positioning a movable body that is moved relative to a fixed body.

2. Description of the Related Art

In machines of various kinds, provided is a movable part that is moved relative to a fixed part. The accuracy in positioning a movable part relative to a fixed part affects largely the precision of the machine. For example, in an indexing mechanism or the like provided to an attachment of a machine tool, a poor positioning accuracy leads to an indexing error. As a result, not only the machining precision is deteriorated, but also the operation may possibly be delayed due, for example, to the need to perform again the indexing.

An attachment provided with an indexing mechanism is mounted on, for example, a ram spindle of a machine tool. The indexing is performed by using a motor linked to the ram spindle. The attachment provided with the indexing mechanism includes a fixed part and a swivel part. The fixed part is fixed to the machine tool while the swivel part is rotatably supported inside the fixed part. The swivel part is rotationally indexed by the ram spindle. A gear coupling is provided between the fixed part and the swivel part for clamping these two parts to each other. In accordance with an indexing instruction sent from a control unit of the machine tool, the ram spindle is rotated, so that the swivel part, which is connected to the ram spindle, is rotationally indexed. However, the indexing is sometimes not accurately performed due to disturbances including: the sliding resistance between the swivel part and the fixed part; a residual pressure in the hydraulic pressure circuit which is provided to the attachment; and the like. When the clamping operation is performed in a state where the indexing has not been accurately performed, the teeth in the gear coupling are not properly engaged. As a result, an index error occurs. An example of such an index error is that the teeth of a half of the gear coupling hit the tops of the teeth of the other half thereof. In such a case, the indexing operation has to be performed again. However, this leads to an operation delay and the like, and is thus not preferable in the operation using the machine tool.

In order to solve such defects, proposed is a method in which a feed back is obtained by externally providing a position detecting device. However, a position detecting device is not easily attached to a ram spindle or an attachment in view of a machining space. Such a position detecting device that can be provided while securing a machining space is complicated in structure and also expensive. In this respect, it has been proposed to provide a sensor to a gear coupling of an indexing device (for example, Japanese Unexamined Patent Application Publication No. Hei 6-182655).

However, the technique described in Japanese Unexamined Patent Application Publication No. Hei 6-182655 has the following problem. Specifically, according to this technique, it cannot be detected that the two halves of a gear coupling are not set in proper positions, unless the two halves come close to each other to some extent, that is, unless a clamping operation is started. However, when it is detected that the two halves are set in improper positions after the starting of the clamping operation, the indexing operation has to be eventually performed again.

In the fields of not only machine tools but also any machinery, a precise positioning of a movable body is demanded in various scenes while it is difficult to provide a position detecting device for positioning a movable body. Accordingly, such a problem as described above often occurs also in cases other than that of the indexing in a machine tool.

SUMMARY OF THE INVENTION

In view of the above-described circumstances, the present invention has been made for solving the above-described problem. An object of the present invention is to precisely position a movable body to a target position without providing a further external structure.

A method of positioning a movable body according to a first aspect of the present invention for solving the above-described problem provides a method of positioning, to a target position, a movable body which is moved relative to a fixed body with a sliding surface of the movable body in between. The method provides the following characteristics. Specifically, in a case where a load at the moving of the movable body relative to the fixed body is smaller than a predetermined value, the positioning is completed when it is determined that the movable body is moved to a position supposed to be the target position. On the other hand, in a case where the load is not smaller than the predetermined value, the positioning is not completed even when it is determined that the movable body is moved to the position supposed to be the target position. Then, the movable body is further moved to a retry starting position which is different from the current position. Subsequently, a retry operation is performed in which the movable body is moved from the retry starting position to the position supposed to be the target position. Thereafter, the positioning is completed in a case where the load becomes smaller than the predetermined value while the retry operation is performed for a predetermined number of times.

The method of positioning a movable body according to a second aspect of the present invention for solving the above-described problem further provides the following characteristics in addition to the first aspect. Specifically, in a case where the positioning is not completed even after the retry operation is performed once more, the retry starting position is changed, and then a plurality of different retry operations are performed. It should be noted that what is meant by the "plurality of retry operations" here is a plurality of retry operations having various contents with retry starting positions different from one another. Each of the retry operations may be executed once or more. The retry starting position in each of the retry operations may be set in accordance with, for example, types of causes of variations in the load on the movable body.

In the method of positioning a movable body according to the second aspect of the present invention, suppose a case where retry operations of two different patterns are performed. In this case, the second method of positioning a movable body according to the second aspect may be described to have the following characteristics. Specifically, the method according to the second aspect is a method for positioning, to a target position, a movable body that is moved relative to a fixed body with a sliding surface of the movable body in between. In a case where a load at the moving of the movable body relative to the fixed body is smaller than a predetermined value, the positioning is completed when it is determined that the movable body is moved to a position supposed to be the target position. On the other hand, in a case where the load is not smaller than the predetermined value, the positioning is not completed even when it is determined that the movable body is moved to the position supposed to be the target position. Then, the movable body is further moved to a first retry starting position from the position supposed to be the target position. Subsequently, a first retry operation is performed in which the movable body is moved from the first retry starting position to the position supposed to be the target position. In a case where the load becomes smaller than the predetermined value while the first retry operation is performed for a predetermined number of times. On the other hand, suppose a case where the load does not become smaller than the threshold value even after the first retry operation is performed for the predetermined number of times. In this case, the movable body is moved to a second retry starting position which is different from the first retry starting position. Then, a second retry operation is performed in which the movable body is moved from the second retry starting position to the position supposed to be the target position. In a case where the load becomes smaller than the threshold value while the second retry operation is performed for a predetermined number of times, the positioning is completed. On the other hand, suppose a case where the load does not become smaller than the threshold value even after the second retry operation is performed for the predetermined number of times. In this case, the movable body is moved from the second retry starting position to a third retry starting position which is different from the second retry starting position. Then, a third retry operation is performed in which the movable body is moved from the third retry starting position to the position supposed to be the target position. In a case where the load becomes smaller than the threshold value while the third retry operation is performed for a predetermined number of times, the positioning is completed.

The method of positioning a movable body according to a third aspect of the present invention for solving the above-described problem further provides the following characteristics in addition to the first aspect. Specifically, in a case where the positioning is not completed even after a plurality of different retry operations are performed, a warning is issued.

The method of positioning a movable body according to a fourth aspect of the present invention for solving the above-described problem further provides the following characteristics in addition to the first aspect. Specifically, the movable body is driven by a motor, while the load is the load current of the motor.

The method of positioning a movable body according to a fifth aspect of the present invention for solving the above-described problem further provides the following characteristics in addition to the first aspect. Specifically, the fixed body is a fixed part of an attachment mounted on a machine tool, while the movable body is a swivel part rotatably supported in the fixed part.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 shows a flowchart of an example of the embodiment of the present invention.

DETAILED DESCRIPTION OF THE INVENTION

Although the present invention may be applied to any case where a movable body is positioned relative to a fixed body, a description will be given here of an embodiment in which the present invention is applied to positioning using an index mechanism in an attachment of a machine tool.

Figure 1:
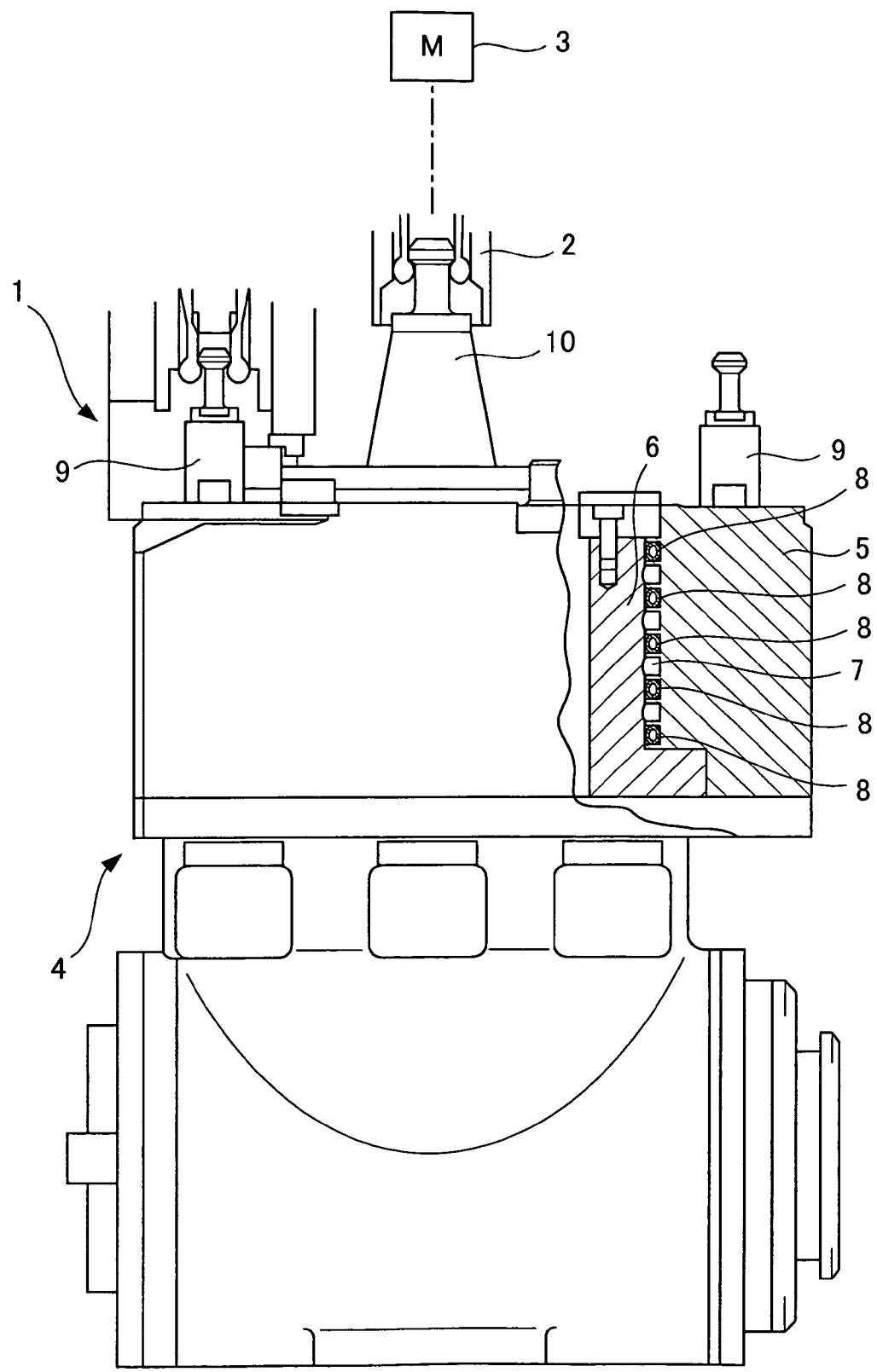
FIG. 1 shows a partially broken away view of an attachment of a machine tool, to which a positioning method is applied, as an embodiment of the present invention.

Firstly, a description will be given of an attachment called a right angle head to which the present invention is applied. FIG. 1 shows a partially broken away view of a right angle head which is attached to a machine tool. A main spindle 2 is supported in a ram 1 of the machine tool. The main spindle 2 is linked to a spindle-driving motor 3 with a gear train and a transmission in between. An attachment 4 is detachably attached to the ram 1. The attachment 4 is provided with a fixed part 5 and a swivel part 6. The fixed part 5 is fixed to the lower surface of the ram 1, while the swivel part 6 is disposed inside the fixed part 5, and is slidable and rotatable relative to the fixed part 5. Oil grooves 7 are formed between the fixed part 5 and the swivel part 6. In addition, O-rings 8 are provided on the periphery of the swivel part 6. Accordingly, when the swivel part 6 is slid and rotated relative to the fixed part 5, the O-rings 8 are in sliding contact with the inner surface of the fixed part 5. A hydraulic pressure is supplied to the oil grooves 7 for the detaching, the attaching, and the like, of a tool. Clamp shafts 9 for fixing the fixed part 5 to the ram 1 side are provided on the upper surface of the fixed part 5.

The attachment 4 includes a rotating shaft 10 which is connected to the main spindle 2. The rotating shaft 10 is linked to an attachment shaft (not shown in FIG. 1) to which the tool is connected. A gear coupling for rotation is provided between the rotating shaft 10 of the attachment 4 and the swivel part 6, while a gear coupling for clamping is provided for fixing the swivel part 6 to the fixed part 5. The gear coupling for rotation is engaged when the swivel part 6 is rotated. Specifically, the main spindle 2 of the machine tool is connected to the swivel part 6 with the gear coupling for rotation in between. Then, the swivel part 6 is rotated in conjunction with the rotation of the main spindle 2 (about the C axis), so that indexing (positioning) is performed. After the indexing, the gear coupling for rotation between the main spindle 2 and the swivel part 6 is disengaged while the gear coupling for clamping is engaged. As a result, the swivel part 6 is fixed to the fixed part 5.

Figure 2:
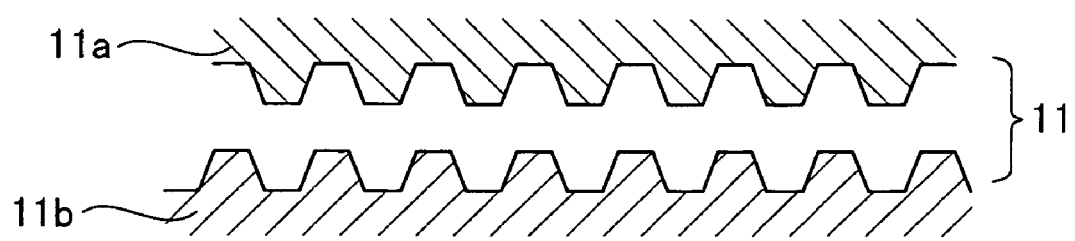
FIG. 2 shows a cross-sectional view of a part of a gear coupling for clamping.
Figure 3:
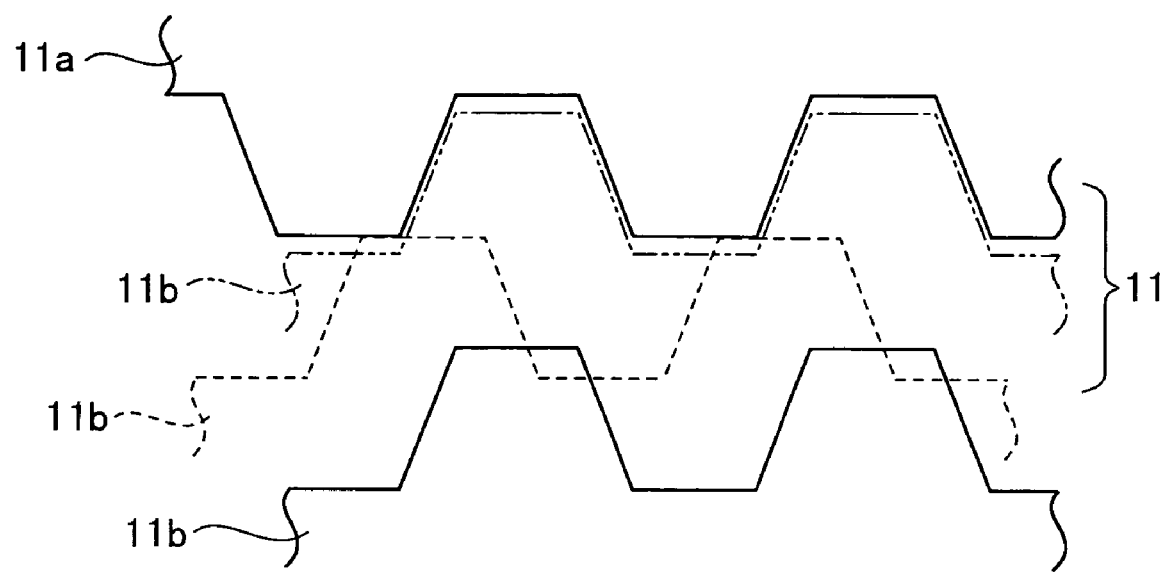
FIG. 3 shows a schematic view showing a state where the gear coupling for clamping is engaged.

FIG. 2 shows a part of the gear coupling 11 for clamping. The gear coupling 11 consists of two gear coupling elements 11a and 11b. The gear coupling element 11a is arranged on the fixing side while the gear coupling element 11b is arranged on the indexing side (the moving side). Each of the gear coupling elements 11a and 11b has a shape like a face gear in which teeth are formed in the surface of a ring-shaped disc. Suppose a case where the indexing is accurately performed, so that the gear coupling 11 is engaged. In this case, the gear coupling element 11b meshes with the gear coupling element 11a without misalignments, as indicated by the alternate long and two short dashes line in FIG. 3. By contrast, when the indexing is inaccurately performed, the teeth of the gear coupling element 11b hit the tops of the corresponding teeth of the gear coupling element 11a as indicated by the dashed line in FIG. 3. In the present invention, in order to prevent such an incident from occurring, the indexed position is corrected before the clamping operation is performed.

FIG. 4 shows a flowchart of a position-correcting control according to an example of the embodiment.

For performing the indexing, the gear coupling 11 for clamping is firstly unclamped (Step S1). Then, an indexing instruction is outputted by a control unit of the machine tool (Step S2). Upon the output of the indexing instruction, the spindle-driving motor 3 is driven to rotate the swivel part 6 which is linked to the main spindle 2. The value of a counter provided to the control unit is set at zero (Step S3). The moving and positioning of the swivel part 6 to the indexed position is achieved by a feedback control.

When the swivel part 6 is rotated, the load current value (the load) of the spindle-driving motor 3 is read (Step S4). The load is read all the time when the swivel part 6 is swiveled. After that, it is determined whether or not the load is smaller than a predetermined load threshold (Step S5). This load threshold is experimentally or empirically obtained. Between the fixed part 5 and the swivel part 6, there are, for example, a resistance due to the contact of the metal portions (metal touch), a resistance due to the O-rings 8, a resistance due to the residual pressure of the hydraulic pressure. The load threshold is determined for each of these conditions where the sliding resistance associated with these factors is increased.

Between the fixed part 5 and the swivel part 6, provided is a rotary joint for supplying the hydraulic pressure from the fixed part 5 side to the swivel part 6 side. As to O-rings used for the rotary joint, because of the structure of the rotary joint, the sliding speed is different between the radially inner portion and the radially outer portion of each O-ring. Accordingly, torsion and gall are likely to occur in the O-rings. For the purpose of solving this problem, generally used is an O-ring coated with Teflon or an O-ring to which a low-frictional-resistance member is attached. However, minute torsion and gall inevitably occur due to a change in squeeze of the O-rings associated with age deterioration and component error of the O-rings, and the like. Such minute torsion, wear and gall do not lead to defects, such as the leakage of pressure oil, but may be a factor causing a change in sliding resistance of the O-rings. The change in sliding resistance becomes a destabilizing factor in the indexing operation of the attachment. Accordingly, eliminating influences of "minute torsion" and "minute gall," which are causes of the destabilizing factor, makes it possible to achieve a stable indexing operation.

Suppose a case where the detected load is smaller than the load threshold. When it is determined that the swivel part 6 is moved to the indexed position, the clamping operation is performed (Step S6). In other words, the gear coupling 11 is engaged. The determination as to whether the swivel part 6 has been moved to the indexed position is made in the following manner. The position of the swivel part 6 is detected by using an encoder or the like. The result of the detection is then compared with the value of the indexing instruction. When the result of the detection is equal to the value of the indexing instruction, it is determined that the swivel part 6 is indexed to the instructed indexing position.

On the other hand, in a case where the detected load is not smaller than the load threshold, the sliding resistance has become larger than that of the normal state. Accordingly, a retry operation, which will be described later, is performed. Note that, as described above, variation in the load may be caused by, for example, minute torsion, minute local wear, and minute gall, of the O-rings 8. For this reason, the retry operation is performed as a fine operation so that torsion of the O-rings 8, for example, can be removed. As the O-rings 8 are worn down, the sliding resistance is reduced. Accordingly, the swivel part 6 goes over the instructed indexing position when the positioning of the swivel part 6 is stopped. When the swivel part 6 goes over the instructed indexing position, the motor 3 operates to move the swivel part 6 back by a reverse rotation. At this time, the load (the load current) exceeds the load threshold.

For performing the retry operation, the current counter value is firstly checked, and then a pattern of the retry operation is selected in accordance with the checked counter value. When the counter value is "0," "1" or "2," a first retry operation 1 is performed. When the counter value is "3" or "4," a second retry operation 2 is performed. When the counter value is "5," a third retry operation 3 is performed. Since the initial value of the counter is zero (Step S7), the first retry operation 1 is firstly performed (Step S8). In the first retry operation 1, the swivel part 6 is moved from the indexing position to another predetermined position (a first retry starting position), and then the indexing operation is performed again from the first retry starting position. Upon selection of the first retry operation 1, the counter value is incremented by one (Step S9). In the first retry operation 1, Steps S4 and S5 are repeatedly performed. Specifically, the load is read (Step S4), and then whether or not the load is smaller than the load threshold is determined (Step S5). During the first retry operation 1, when the load becomes smaller than the load threshold, the swivel part 6 is considered to be positioned in a state where factors, which are caused by variation in sliding resistance or the like to interfere with the accurate positioning, are eliminated. Accordingly, the clamping operation is performed at the indexing position.

When the load does not become smaller than the load threshold after the first retry operation 1 is performed once, the first retry operation 1 is performed again. At this time, the counter value is incremented by one (the counter value=the counter value+1). When the load does not become smaller than the load threshold even after the first retry operation 1 is performed twice, the counter value reaches "3" (Step S9). Accordingly, the second retry operation 2, which is another retry operation, is employed (Step S11).

After the counter value is incremented by one to reach "3" (Step S9), the second retry operation is performed in the following manner (Steps S10 and S11). Specifically, in the second retry operation 2, the swivel part 6 is firstly moved to a position different from the position where the first retry operation 1 is started (the first retry starting position). Then, the indexing operation is performed from the position as a second retry starting position. In the second retry operation 2, factors affecting the sliding movement of the swivel part 6 are supposed to be different from those in the case of the first retry operation 1. For example, in terms of the state of the O-rings 8, the O-rings 8 are supposed to have been deformed into a state different from that which can be handled by performing the first retry operation 1.

In the second retry operation 2 as well, the load of the main spindle is read (Step S4), and is then compared with the load threshold (Step S5), as in the case of the first retry operation 1. In a case where the load is determined to be smaller than the load threshold, the clamping operation is performed when the swivel part 6 is moved to the indexing position (Step S6).

In a case where the load at the operation of the swivel part 6 does not become smaller than the load threshold even after the second retry operation 2 is performed twice, the counter value reaches "5" (Step S9). Accordingly, the third retry operation 3 is employed (Step S13). After the count value is incremented by one (Step S9), the third retry operation 3 is performed in the following manner (Steps S12 and S13) Specifically, in the third retry operation 3, the swivel part 6 is firstly moved to a position different from the positions where the retry operation is to be started in the respective first and second retry operations 1 and 2 (the first and second retry starting positions). Then, the indexing operation is performed from the position as a third retry starting position. In the third retry operation 3, factors affecting the sliding movement of the swivel part 6 are supposed to be different from those in the second retry operation 2. For example, in terms of the state of the O-rings 8, the O-rings 8 are supposed to have been deformed into a state different from that which can be handled by performing the second retry operation 2.

In the third retry operation 3 as well, the load of the main spindle is read (Step S4), and is then compared with the load threshold (Step S5), as in the case of the first retry operation 1. In a case where the load is smaller than the load threshold, when the swivel part 6 is determined to be moved to the indexing position, the clamping operation is performed (Step S6).

In a case where the load does not become smaller than the load threshold after the third retry operation 3 is performed once, the counter value reaches "6." When the counter value is "6" (Step S14), the retry operation is no longer performed, and then an alarm is generated for indicating that the retry operation is over (retry over) (Step S15). The alarm is given by voice, an image, or the like. When the alarm is given, there may be, between the swivel part 6 and the fixed part 5, factors other than those, such as minute torsion and the like of the O-rings 8, which cause the first- to third retry operations 1 to 3 to be performed. Such factors include, for example, the occurrence of age deterioration of the O-ring 8, and the like.

The retry starting position for performing each of the first- to third retry operations 1 to 3 is experimentally or empirically obtained, and may be set, for example, in the following manner. It should be noted that the C axis here is an axis indicating the operation of the machine tool, and represents the rotation about the center axis of the swivel part 6.

(1) First Retry Operation 1
    C axis: +0.1° to −0.1°, Indexing Symmetrically In the Left and Right directions
(2) Second Retry Operation 2
    C axis: −0.3° to +0.2°, Indexing Asymmetrically in the Left and Right directions
(3) Third Retry Operation 3
    C axis: +0.3° to −0.2°, Indexing Asymmetrically in the Left and Right directions Specifically, in the first retry operation 1, a rotor is rotated by an angle of 0.1° to the + side relative to the indexed position as a reference position. Thereafter, the rotor is rotated by an angle of 0.1° to the − side relative to the indexed position as the reference position. The position resulting from the movement is referred to as the first retry starting position. The swinging of the swivel part 6 in the right and left directions in this manner is expected to improve the state of the O-rings 8. Similarly, in the second retry operation 2, the rotor is rotated by an angle of 0.3° to the − side relative to the indexed position as the reference position. Thereafter, the rotor is rotated by an angle of 0.2° to the + side relative to the indexed position as the reference position. The position resulting from the movement is referred to as the second retry starting position. In the third retry operation 3, in a manner opposite to that of the second retry operation 2, the rotor is firstly rotated by an angle of 0.3° to the + side relative to the indexed position as the reference position, and is then rotated by an angle of 0.2° to the − side relative to the indexed position as the reference position. The position resulting from the movement is referred to as the third retry starting position.

It should be noted that these above-described retry starting positions are merely an example, and may be experimentally and empirically obtained in accordance with various reasons, such as the mechanical relationship between a fixed body and a movable body. The number of patterns of the retry operation is not limited to three, but may be four or more. In addition, in the above-described embodiment, the description has been given of, as an example, the case of positioning the movable body which is swiveled (rotated) relative to the fixed body. However, the present invention may be applied to a case where a movable body is linearly moved relative to a fixed body. Moreover, the load at the moving a movable body is not limited to the load (current) of the motor. Alternatively, a torque, a force or the like may be detected instead of the load of the motor.

In the method of positioning a movable body according to the first aspect of the present invention, it is determined whether or not a movable body is properly positioned, on the basis of a load at the time of moving the movable body. The position of the movable body is then corrected in accordance with the determination. Accordingly, the positioning can be precisely performed. In addition, since the load on the movable body is detected, an external position detecting device or the like is unnecessary.

In the method of positioning a movable body according to the second aspect of the present invention, the retry operation is performed for a plurality of times. This makes it possible to more precisely perform the positioning.

In the method of positioning a movable body according to the third aspect of the present invention, a warning is issued in a case where the positioning is not completed even after the retry operation is performed for a plurality of times. This makes it possible to announce that the positioning was not precisely performed. Accordingly, it can be assumed that the positioning error has been caused by a factor other than those which were expected in the retry operation.

In the method of positioning a movable body according to the fourth aspect of the present invention, the load is the load current of the motor. Accordingly, a sensor or the like for the positioning is unnecessary.

In the method of positioning a movable body according to the fifth aspect of the present invention, it is possible to perform the indexing of the swivel part which is rotationally supported in the fixed part of the attachment of the machine tool. In addition, it is unnecessary to provide a device, such as a sensor, around the attachment of the machine tool. Moreover, since the position correction is performed by the retry operation before the clamping operation is started, the need for performing the indexing operation again is eliminated. As a result, an operation delay and the like can be avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of positioning a movable body relative to a fixed body by moving the movable body to a target position, comprising:
    reading a load at the moving of the movable body relative to the fixed body;
    determining whether or not the movable body is moved to a position that is supposed to be the target position on the basis of the load;
    moving the movable body to a retry starting position that is different from a current position while the termination of the positioning is not allowed;
    performing a retry operation in which the movable body is moved from a retry starting position to the position that is supposed to be the target position;
    terminating the positioning;
    wherein in a case where the load is smaller than a predetermined value, the positioning is terminated with a determination, in the determining step, that the movable body is moved to the position that is supposed to be the target position, and wherein in a case where the load is not smaller than the predetermined value, the positioning is not terminated even with a determination, in the determining step, that the movable body is moved to the position supposed to be the target position, the movable body is further moved to the retry starting position, the retry operation is performed, and the positioning is terminated in a case where the load becomes smaller than the predetermined value during a predetermined number of retry operations.

2. The method of positioning a movable body according to claim 1 wherein in a case where the positioning is not terminated even with a predetermined number of retry operations from a certain retry starting position, a different retry operation is performed by setting a different retry starting position.

3. The method of positioning a movable body according to claim 2 wherein in a case where the positioning is not terminated even with the different retry operation performed a predetermined plurality of times, a warning is issued.

4. The method of positioning a movable body according to claim 1 wherein the movable body is driven by a motor, and the load is the load current of the motor.

5. The method of positioning a movable body according to claim 1 wherein the fixed body is a fixed part of an attachment mounted on a machine tool, and the movable body is a swivel part rotatably supported in the fixed part.

6. The method of positioning a movable body according to claim 4 wherein the fixed body is a fixed part of an attachment mounted on a machine tool, and the movable body is a swivel part rotatably supported in the fixed part.

* * * * *